(12) United States Patent
Sasaya et al.

(10) Patent No.: US 7,122,982 B2
(45) Date of Patent: Oct. 17, 2006

(54) DC MOTOR ROTATION INFORMATION DETECTING DEVICE

(75) Inventors: Takanari Sasaya, Toyohashi (JP); Michiru Takahashi, Niwa-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/137,570

(22) Filed: May 26, 2005

(65) Prior Publication Data

US 2006/0017412 A1    Jan. 26, 2006

(30) Foreign Application Priority Data

Jul. 23, 2004    (JP)    ............................. 2004-216453

(51) Int. Cl.
*H02P 6/08*    (2006.01)

(52) U.S. Cl. ..................... 318/293; 318/280; 318/287; 318/294; 318/367; 318/368; 318/373; 318/374; 388/907.2; 388/907.5; 388/909; 324/772

(58) Field of Classification Search .................... None
See application file for complete search history.

(56) References Cited

U.S. PATENT DOCUMENTS

| | | | | |
|---|---|---|---|---|
| 3,346,725 | A * | 10/1967 | Allured et al. ................ | 377/16 |
| 3,843,912 | A * | 10/1974 | Anderson .................... | 318/258 |
| 4,011,492 | A * | 3/1977 | Murphy et al. .............. | 318/373 |
| 4,514,670 | A * | 4/1985 | Fassel et al. ................ | 318/467 |
| 4,684,858 | A * | 8/1987 | Ma et al. ..................... | 388/820 |
| 4,788,497 | A * | 11/1988 | Katsumura .................. | 324/177 |
| 4,924,166 | A * | 5/1990 | Roussel ....................... | 318/608 |
| H939 | H * | 7/1991 | Holland ....................... | 324/166 |
| 5,132,602 | A * | 7/1992 | Jorgensen et al. ........... | 318/608 |
| 5,359,376 | A * | 10/1994 | Ogihara et al. .............. | 396/410 |
| 5,459,654 | A * | 10/1995 | Williams et al. ............. | 363/98 |
| 5,497,326 | A * | 3/1996 | Berland et al. .............. | 701/36 |
| 5,506,483 | A * | 4/1996 | McCann et al. ............. | 318/444 |
| 5,514,977 | A * | 5/1996 | Agiman ....................... | 324/772 |
| 5,646,497 | A * | 7/1997 | Stickel ........................ | 318/799 |
| 5,798,624 | A * | 8/1998 | Wilke et al. ................. | 318/254 |
| 5,811,948 | A * | 9/1998 | Sato et al. ................... | 318/434 |
| 5,898,288 | A * | 4/1999 | Rice et al. ................... | 318/685 |
| 6,078,154 | A * | 6/2000 | Manlove et al. ............. | 318/293 |
| 6,104,155 | A * | 8/2000 | Rosa .......................... | 318/381 |
| 6,144,179 | A * | 11/2000 | Kessler et al. .............. | 318/565 |
| 6,150,784 | A * | 11/2000 | Nagaoka ..................... | 318/467 |
| 6,172,473 | B1 * | 1/2001 | Oka et al. .................... | 318/244 |
| 6,236,177 | B1 * | 5/2001 | Zick et al. ................... | 318/362 |
| 6,262,546 | B1 * | 7/2001 | Draves et al. ............... | 318/293 |
| 6,320,341 | B1 * | 11/2001 | Oka et al. .................... | 318/466 |
| 6,326,757 | B1 * | 12/2001 | Aoki et al. ................... | 318/599 |
| 6,380,757 | B1 * | 4/2002 | Draves et al. ............... | 324/772 |

(Continued)

FOREIGN PATENT DOCUMENTS

JP    A-2000-308390    11/2000

(Continued)

*Primary Examiner*—Lincoln Donovan
*Assistant Examiner*—Robert W. Horn
(74) *Attorney, Agent, or Firm*—Posz Law Group, PLC (57) ABSTRACT

A rotation information detection device detects rotation information of a DC motor based on a surge component waveform superimposed on a voltage waveform between the terminals of the DC motor or a current waveform of the DC motor, a circuit is provided which supplies a current of a current value $I_{pwm}$ 45% during motor forward rotation or $I_{pwm}$ 55% during reverse motor rotation to the motor over the period from when the motor starts braking operation to when it stops.

14 Claims, 6 Drawing Sheets

U.S. PATENT DOCUMENTS

| | | | |
|---|---|---|---|
| 6,437,533 B1 * | 8/2002 | Du et al. | 318/560 |
| 6,456,028 B1 * | 9/2002 | Aoki et al. | 318/470 |
| 6,525,507 B1 * | 2/2003 | Ganz | 320/101 |
| 6,552,506 B1 * | 4/2003 | Kramer et al. | 318/466 |
| 6,559,616 B1 * | 5/2003 | Aoki et al. | 318/567 |
| 6,570,350 B1 * | 5/2003 | Ohno et al. | 318/254 |
| 6,593,716 B1 * | 7/2003 | Lange et al. | 318/471 |
| 6,617,816 B1 * | 9/2003 | Ohno et al. | 318/560 |
| 6,628,893 B1 * | 9/2003 | Ohno et al. | 388/800 |
| 6,674,191 B1 * | 1/2004 | Kujira | 310/68 B |
| 6,680,596 B1 * | 1/2004 | DeCicco | 318/439 |
| 6,768,282 B1 * | 7/2004 | Lutter et al. | 318/603 |
| 6,788,096 B1 * | 9/2004 | Holmquist et al. | 324/772 |
| 6,798,162 B1 * | 9/2004 | Makaran et al. | 318/442 |
| 6,801,007 B1 * | 10/2004 | Takeuchi et al. | 318/479 |
| 6,801,009 B1 * | 10/2004 | Makaran et al. | 318/599 |
| 6,822,409 B1 * | 11/2004 | Lange et al. | 318/434 |
| 6,847,179 B1 * | 1/2005 | Du et al. | 318/560 |
| 6,885,160 B1 * | 4/2005 | Takeuchi | 318/139 |
| 6,940,241 B1 * | 9/2005 | Lange et al. | 318/434 |
| 6,954,096 B1 * | 10/2005 | Ito et al. | 327/172 |
| 6,967,451 B1 * | 11/2005 | Miyauchi | 318/443 |
| 2002/0008483 A1 * | 1/2002 | Kaeufl et al. | 318/280 |
| 2004/0100216 A1 * | 5/2004 | Makaran et al. | 318/434 |
| 2006/0017412 A1 * | 1/2006 | Sasaya et al. | 318/368 |

FOREIGN PATENT DOCUMENTS

| | | |
|---|---|---|
| JP | A-2001-138812 | 5/2001 |
| JP | A-2003-49586 | 2/2003 |

* cited by examiner

| INPUT | | | OUTPUT | | |
|---|---|---|---|---|---|
| $\overline{CLR}$ | $\overline{A}$ | B | Q | $\overline{Q}$ | |
| L | L/H | L/H | L | H | PROHIBITED |
| ↑ | L | H | ⊓ | ⊔ | ALLOWED |
| H | ↓ | H | ⊓ | ⊔ | ALLOWED |
| | L | ↑ | ⊓ | ⊔ | ALLOWED |
| | H | L/H | L | H | PROHIBITED |
| L/H | L | L | L | H | PROHIBITED |

DC MOTOR ROTATION INFORMATION DETECTING DEVICE

CROSS REFERENCE TO RELATED APPLICATION

This application is based on and incorporates herein by reference Japanese Patent Application No. 2004-216453 filed on Jul. 23, 2004.

FIELD OF THE INVENTION

The present invention relates to a DC motor rotation information detecting device, and more particularly to a device that detects rotation information of a DC motor having brushes based on a signal waveform such as its current waveform and a voltage waveform between its terminals.

BACKGROUND OF THE INVENTION

An automobile includes a number of systems using DC brush motors, for comfort and usability. For example, an air conditioner is provided with several DC motors for driving a door for changing its outlet and an air mix amount. The positions of door mirrors, sheet positions, and window positions in a power window system are operated by DC motors used as actuators. Furthermore, DC motors are also used in a system that changes the optical axis of headlight according to a steering turning angle.

In these systems, the positions of driving targets such as door positions, mirror positions, sheet positions, window positions, headlight positions are controlled by DC motors. Therefore, it is important to detect the positions of driving targets, that is, motor rotation information.

Conventional methods of detecting the positions of driving targets (motor rotation information) include a method of determining positions by measuring motor rotation information using Hall sensors and the like as described in JP 2003-049586A, and a method of determining positions by potentiometers. However, since such methods require sensors such as the Hall sensors and potentiometers, an increase in costs of the sensors and sensor mounting, and reduction in reliability due to spatial limitations, an increase in the number of signal lines, and sensor life cannot be ignored.

Accordingly, a method not requiring such sensors is proposed. According to the method, a ripple component waveform and a surge component waveform superimposed on a signal waveform (driving signal waveform) of one of voltage between the terminals of a motor and a current flowing through the motor are extracted, and motor rotation information is obtained based on the extracted ripple component waveform and surge component waveform.

Specifically, when a DC brush motor is driven, a driving signal waveform of the motor is represented as a surge component waveform due to discontinuity at the time of switching between the brushes and segments of commutators, added to a ripple component waveform of a specified cycle. For example, in the case of a motor having two brushes and three commutators, six ripples and surges occur in a driving signal waveform of the motor per rotation. Therefore, pulse signals corresponding to motor rotation are generated by extracting signals corresponding to a ripple component waveform and a surge component waveform from the driving signal waveform of the motor through appropriate filters and the like, and binarizing the extracted signals based on specified threshold values. By successively counting the number of pulses of the pulse signals thus generated, motor rotation information is obtained.

The surge component waveform is a high-frequency signal. Therefore, it is easily separated from low-frequency components attributable to fluctuations of external loads applied to a motor shaft and fluctuations of motor rotation speeds, contained in the driving signal waveform together with the surge component waveform. Therefore, methods of using a surge component waveform are considered to be particularly useful to detect motor rotation information, as proposed in JP 2000-308390A and JP 2001-138812A.

Figure 8:
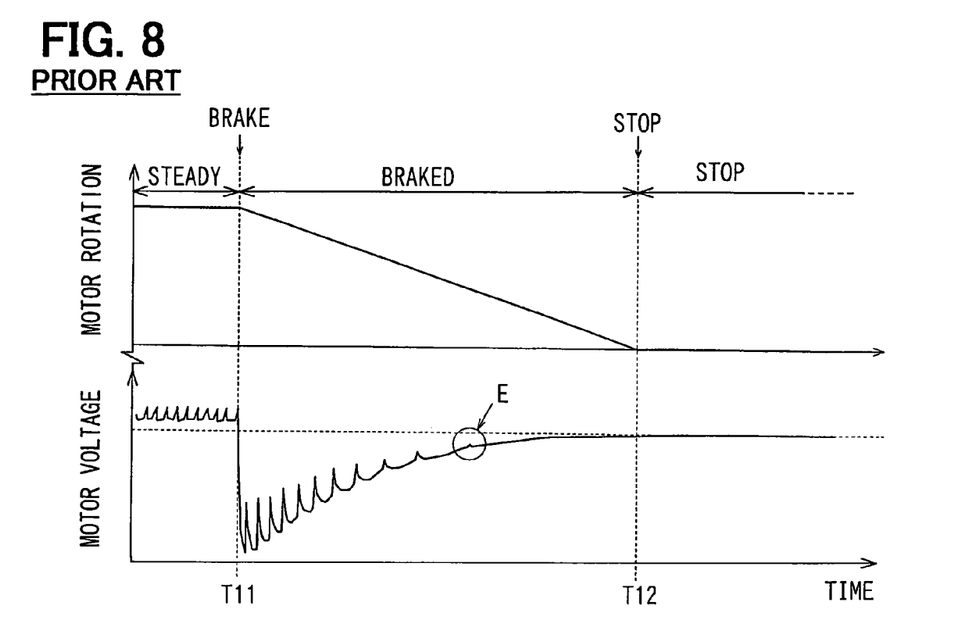
FIG. 8 is a timing chart showing examples of rotation information detection conditions by a conventional DC motor rotation information detecting device.
Figure 9A:
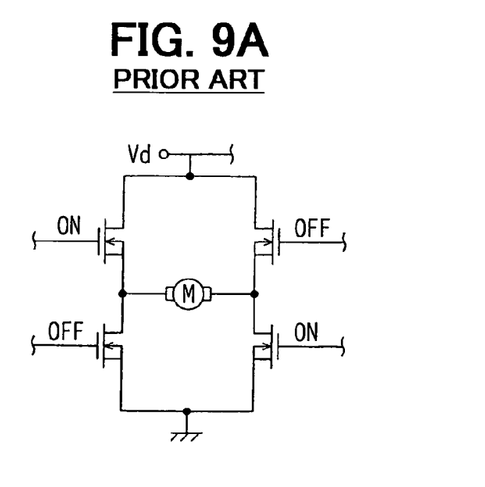
FIGS. 9A and 9B are circuit diagrams showing examples of rotation information detection conditions by the device.
Figure 9B:
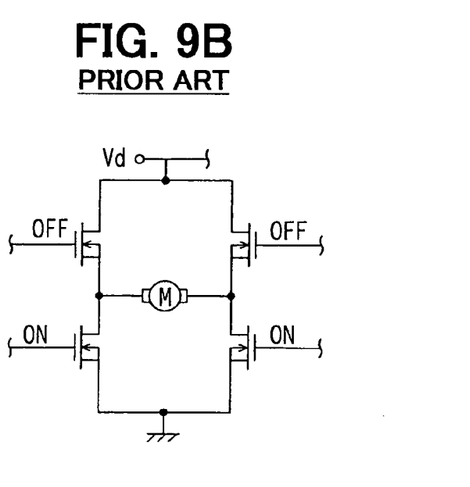

FIGS. 8 and 9 show examples of rotation information detection conditions of a device that obtains motor rotation information based on a surge component waveform. FIG. 8 is a time chart showing the transition of rotation speeds of a motor and the transition of a surge component superimposed on a motor voltage waveform between the terminals of the motor. FIGS. 9A and 9B are circuit diagrams showing the driving conditions of the motor in the operation modes of steady operation and braking operation.

As shown in FIG. 8, the motor is in steady operation until switching to braking operation at timing T11. As shown in FIG. 9A, an appropriate driving signal is fed to transistors constituting a bridge circuit, which is a driving circuit of a motor M, and a driving voltage Vd is applied to the motor M. When the motor M is switched to braking operation at timing T11, that is, as shown in FIG. 9B, when an appropriate driving signal is fed to the transistors of the bridge circuit and the terminals of the motor M are short-circuited, regenerative braking is applied to the motor M and its rotation speed begins to decrease.

Since a surge component waveform is attributable to self-induction of a motor coil when the segments of brushes and commutators are switched, when a current flowing through the motor (motor coil) is smaller, its signal strength becomes smaller. An induction current is fed to the motor M by counter-electromotive force due to inertia rotation (power generation operation) during braking operation. However, since the induction current decreases as the rotation speed of the motor M decreases, a surge detection error (counting error) E or the like might occur immediately before the motor stops (timing T12). Furthermore, such detection errors are accumulated in applications in which start and stop of the motor are frequently repeated, possibly leading to a large detection error.

SUMMARY OF THE INVENTION

The present invention has an object to provide a DC motor rotation information detecting device that can accurately detect rotation information of the motor even in applications in which start and stop of the motor are frequently repeated.

The present invention according to one aspect provides a DC motor rotation information detecting device, which detects rotation information of a DC brush motor based on a surge component waveform superimposed on a signal waveform of at least one of a current flowing through the DC brush motor and a voltage between the terminals of the motor. The device controls a current flowing through the motor so that a current flowing through the motor in the period from when the motor starts braking operation to when it stops is equal to or greater than a reference current value set as its lower limit.

In the period from when a motor to detect rotation information from starts braking operation to when it stops, even when the motor is in a state immediately before it stops, that is, an induction current due to power generation operation flows little through it as the speed of inertial rotation decreases, a current equal to or greater than the reference current value flows through the motor (motor coil). As a result, signal strength corresponding to the reference current value is surely obtained for a surge component waveform superimposed on a signal waveform of at least one of a current flowing through the motor and a voltage between the terminals of the motor. Accordingly, the surge detection errors (count errors) attributable to reduction in current values are reduced. In this way, by adopting the construction as a device for detecting rotation information of a DC motor, rotation information of the motor can be accurately detected even in applications in which start and stop of the motor are frequently repeated.

Furthermore, in this case, a unit for controlling a current flowing through the motor is configured with a bridge circuit driven to perform current control by the pulse width modulation system, and a voltage regulator that converts voltage applied to the bridge circuit into a predetermined voltage. By this construction, stable voltage is applied to the bridge circuit in any of the case where an unstable power supply such as an on-vehicle battery is used, or the case where power voltage fluctuates due to load fluctuations of power supply. Therefore, a current supplied to the motor via the bridge circuit corresponds well to a driving signal (pulse width modulation signal) fed to the bridge circuit, so that more correct motor control is performed.

The present invention according to another aspect provides a DC motor rotation information detecting device, which detects rotation information of a DC brush motor based on a surge component waveform superimposed on a signal waveform of a voltage between the terminals of the motor. The device includes a unit that provides sections in which impedance between the terminals of the motor is increased, as detection regions of the surge component waveform superimposed on the signal waveform.

Increasing impedance between the terminals of a motor to detect rotation information increases signal strength for a surge component waveform superimposed on a signal waveform of a voltage between the terminals (voltage waveform between the terminals) of the motor and reveals it. Accordingly, by providing the section in which impedance between the terminals of the motor is increased, as detection regions of a surge component waveform superimposed on the signal waveform, the surge detection errors (count errors) attributable to decrease in current values are suitably reduced, and rotation information of the motor can be accurately detected even in applications in which start and stop are frequently repeated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
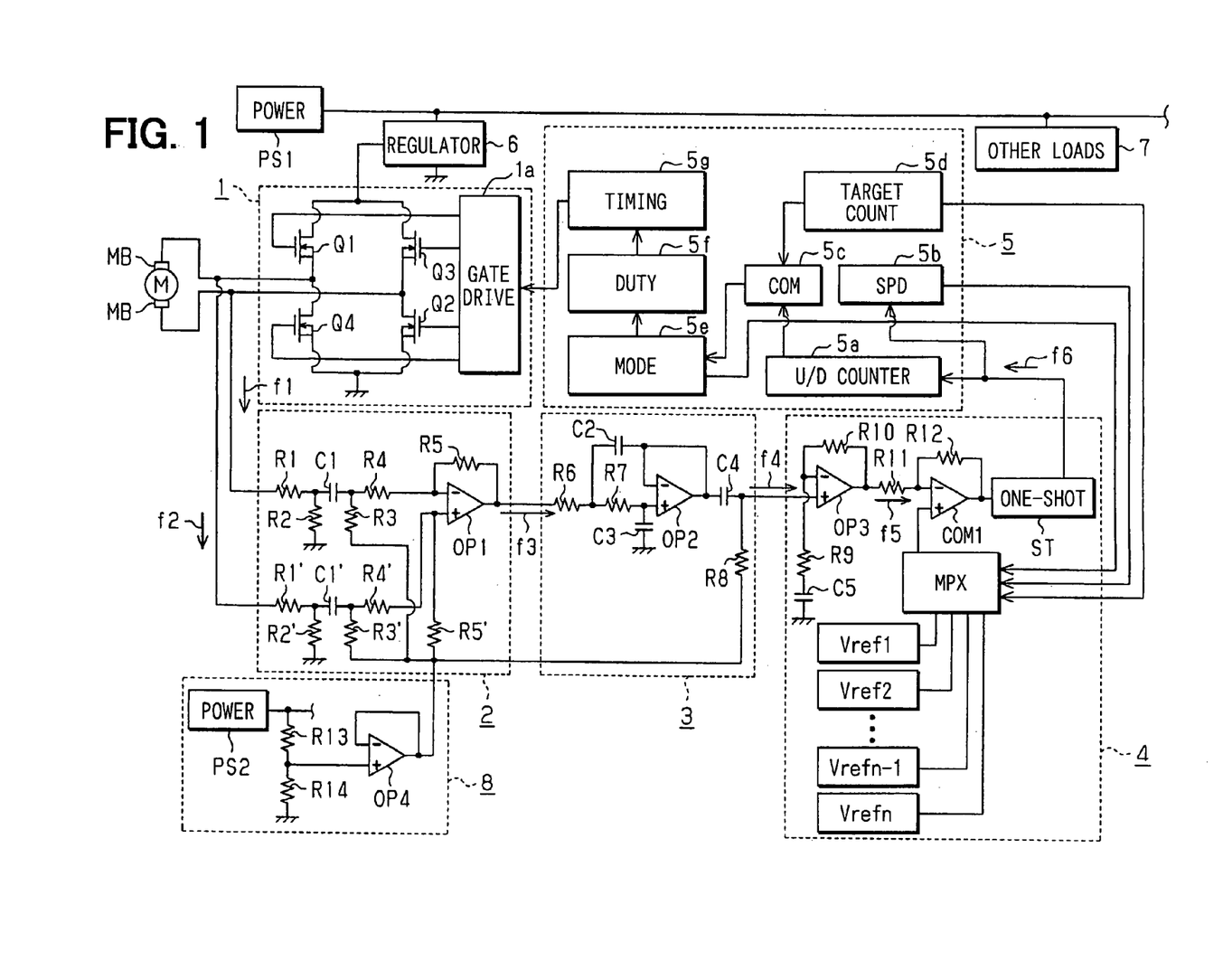
FIG. 1 is a block diagram showing an embodiment of a DC motor rotation information detecting device according to the present invention.

As shown in FIG. 1, a DC motor rotation information detecting device primarily comprises a driving current control circuit 1, a driving waveform detection circuit 2, a rotation signal extraction circuit 3, a rotation pulse generation circuit 4, a control circuit 5, and a voltage regulator 6. The device is connected with a power supply PS1 of, e.g., power voltage 12V.

A DC motor M, rotation information of which is to be detected, has a pair of brushes MB connected with a driving current control circuit 1 that controls a driving current to the motor M, and a driving waveform detection circuit 2 for detecting a voltage waveform between the terminals of the motor M.

The driving current control circuit 1 includes four power MOSFETs (field effect transistor) Q1 to Q4 as switching elements. A rotation direction, rotation speed, and the like of the motor M are controlled by pulse width modulation (PWM) control through a bridge circuit (full bridge) comprising the transistors Q1 to Q4. Each of the transistors Q1 to Q4 constituting the bridge circuit is driven through a gate driving circuit 1a. That is, for example, when driving signals (pulse duration modulation signals) for the transistors Q1 to Q4 are fed from the control circuit 5 to the gate driving circuit 1a, the gate driving circuit 1a respectively drives the transistors Q1 to Q4 based on the fed driving signals.

The voltage from the power supply PS1 applied to the bridge circuit is converted or regulated into a constant voltage through the voltage regulator 6. By this construction, stable voltage is applied to the bridge circuit in any of the case where an unstable power supply such as an on-vehicle battery is used as the power supply PS1, or the case where power voltage of the power supply PS1 fluctuates due to load fluctuations caused when an electrical load (other electrical loads) 7 other than the device is connected to the power supply PS1 in parallel with the device. Therefore, a current supplied to the motor M through the bridge circuit corresponds well to driving signals fed to the bridge circuit (pulse width modulation signal), so that more accurate motor control is performed.

Motor control systems by pulse width modulation control are basically classified into two categories. As the first system, by determining a rotation direction of the motor M by turning on either of the transistors Q1 and Q3 and driving one of the transistors Q2 and Q4 corresponding to it based on a pulse width modulation signal, the value of a current flowing through the motor M, that is, a rotation speed of the motor M is controlled.

As the second system, by driving the transistors Q1 and Q2, and Q3 and Q4 based on pulse width modulation signals of mutually inverse phase, a rotation direction, a rotation speed and the like of the motor M are controlled. That is, in the second system, both the rotation direction and the rotation speed of the motor M can be controlled by one driving signal (pulse width modulation signal). For example, when the duty ratio of a driving signal for the transistors Q1 to Q4 exceeds 50%, that is, when the ratio of a period during which the transistors Q1 and Q2 are ON is long, the motor M rotates forward. Conversely, when the duty ratio of the driving signal is less than 50%, that is, when the ratio of a period during which the transistors Q3 and Q4 are ON is long, the motor M rotates reversely. When the duty ratio of the driving signal is just 50%, the motor stops. The DC motor rotation information detecting device thus controls the rotation of the motor M through the pulse width modulation control of the second system.

Figure 2:
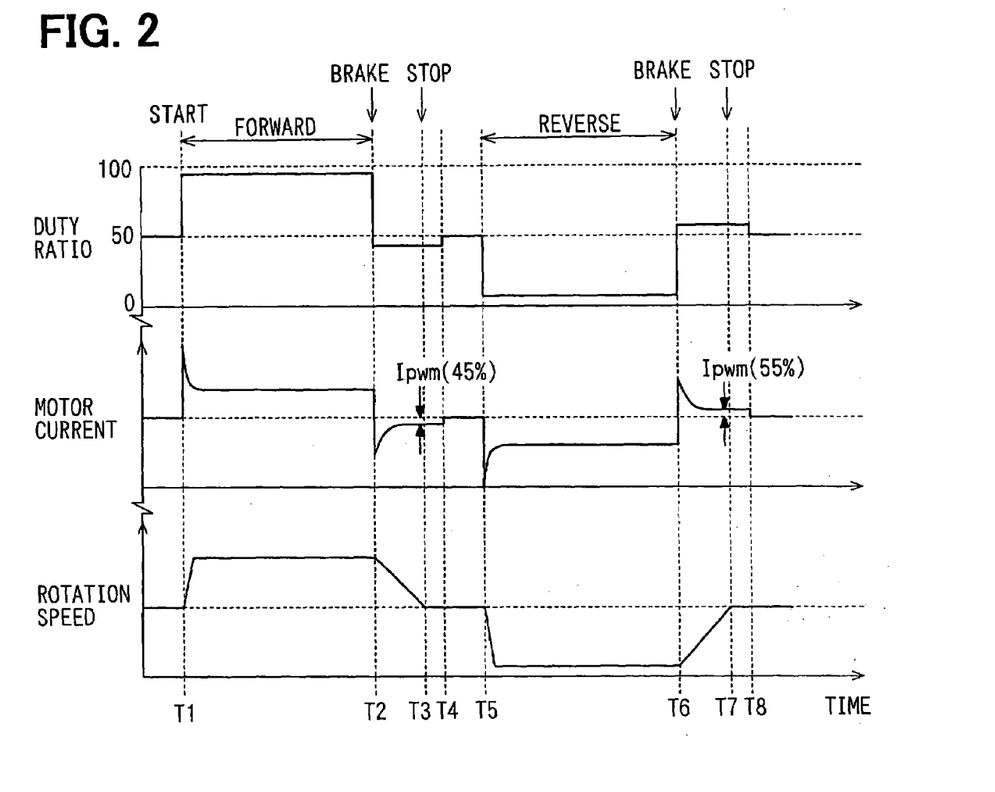
FIG. 2 is a timing chart showing examples of rotation information detection conditions by the DC motor rotation information detecting device according to the embodiment.

FIG. 2 shows an example of a method of detecting rotation information. Specifically, FIG. 2 shows the duty ratio (%) of a driving signal (pulse width modulation signal) for the transistors Q1 to Q4, the motor current flowing through the motor M and the rotation speeds of the motor M. When the duty ratio of the driving signal for the transistors Q1 to Q4 is 45 to 55%, torque added to the motor by a current based on the driving signal is smaller than loss torque obtained by adding internal loss torque of the motor M and external loss torque by external load applied to the shaft of the motor M. The internal loss torque of the motor M is internal loss torque of the motor M when no load is applied, primarily friction torque and the like. The external load applied to the shaft of the motor M is, for example, the resistance of a reduction gear and a mechanical load of doors and the like connected to the reduction gear. For example, in the case of a motor for damper doors in air conditioners, external loads include a reduction gear of about 1/700, a link mechanism connected to the output shaft of the reduction gear, damper doors and the like.

As shown in FIG. 2, the motor M is started to rotate forward at timing T1, and after a predetermined steady operation period elapses, the forward rotating motor M is started to be braked at timing T2. At timing T2, the duty ratio of the driving signal for the transistors Q1 to Q4 is changed from 85% at the forward rotation to 45%. The duty ratio (45%) is set in the control circuit 5 in advance as a current value that enables appearance of a surge component waveform superimposed on a voltage waveform (or current waveform) between the terminals of the motor M.

Thus, in the period (T2 to T3) from when the motor M starts the braking operation to when it stops, a current (motor current) flowing through the motor primarily includes an induction current generated in the motor M by counter-electromotive force due to inertia rotation (power generation operation), and a current supplied from the outside (bridge circuit) based on a driving signal of duty ratio 45%. Accordingly, in this period, even when the motor is in a state immediately before it stops, that is, an induction current due to power generation operation flows little through it as the speed of inertial rotation decreases, at least a current of a current value $I_{pwm}$ 45% (reference current value) obtained by the driving signal of duty ratio 45% flows through the motor (motor coil). As a result, signal strength corresponding to the current value $I_{pwm}$ 45% is surely obtained for a surge component waveform superimposed on a voltage waveform (or current waveform) between the terminals of the motor M, so that the surge detection errors (count errors) attributable to reduction in current values are suitably reduced.

In this case, the direction of a current supplied to the motor M is set to the same as that of the induction current due to power generation operation of the motor M. By this construction, the supplied current and the induction current due to power generation operation do not cancel out each other. Thus, a certain current flows through the motor M. Furthermore, regardless of the magnitude of the induction current, at least a current of the current value $I_{pwm}$ 45% flows through the motor M without fail. Since the current supplied to the motor M adds torque in a direction (reverse rotation direction CCW) opposite to the direction (forward rotation direction CW) of rotation due to inertia during braking operation to the motor M, braking time of the motor M can be expected to be reduced. Furthermore, since the torque added to the motor M by the current of the current value $I_{pwm}$ 45% is smaller than loss torque obtained by adding internal loss torque of the motor M and external loss torque by external load applied to the shaft of the motor M, the motor M is not rotated by the current even when the motor M is in a state immediately after it stops (period T3 to T4).

At timing T4, the duty ratio of the driving signal for the transistors Q1 to Q4 is changed from 45% to 50%. The reverse rotation of the motor M is started at timing T5. After predetermined steady operation period elapses, the reversely rotating motor M is started to be braked at timing T6. That is, at the timing T6, the duty ratio of the driving signal for the transistors Q1 to Q4 is changed from 15% at the reverse rotation to 55%. The duty ratio (55%) is also set in the control circuit 5 in advance as a current value that enables the reveal of a surge component waveform superimposed on a voltage waveform (or current waveform) between the terminals of the motor M.

In the period (T6 to T7) from when the motor M starts the braking operation to when it stops, at the forward rotation, at least a current of the current value $I_{pwm}$ 55% (reference current value) supplied through the bridge circuit based on the driving signal of duty ratio 55% flows through the motor M. As a result, even when the motor M is in a state immediately before it stops, signal strength corresponding to the current value $I_{pwm}$ 55% is surely obtained for a surge component waveform superimposed on a voltage waveform (or current waveform) between the terminals of the motor M, so that the surge detection errors (count errors) attributable to reduction in current values are suitably reduced.

Also in this case, the direction of a current supplied to the motor M is set to the same as that of the induction current due to the power generation operation of the motor M. By this construction, the supplied current and the induction current due to the power generation operation do not cancel out each other, and a certain current flows through the motor M. Furthermore, regardless of the magnitude of the induction current, at least a current of the current value $I_{pwm}$ 55% flows through the motor M without fail. Since the current supplied to the motor M adds torque in a direction (forward rotation direction CW) opposite to the direction (reverse rotation direction CCW) of rotation due to inertia during braking operation to the motor M, braking time of the motor M can be expected to be reduced. Furthermore, since the torque added to the motor M by the current of the current value $I_{pwm}$ 55% is smaller than loss torque obtained by adding internal loss torque of the motor M and external loss torque by external load applied to the shaft of the motor M, the motor M is not rotated by the current even when the motor M is in a state immediately after it stops (period T7 to T8).

Figure 3A:
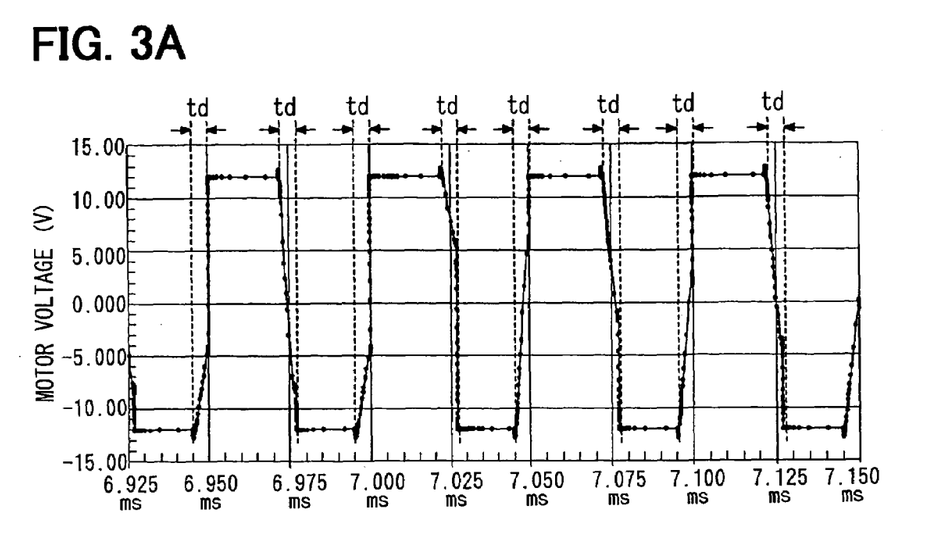
FIGS. 3A and 3B are timing charts showing an example of a voltage waveform between the terminals of a motor when subjected to pulse width modulation control through a bridge circuit.

FIG. 3A is a timing chart showing an example of a voltage waveform between the terminals of the motor M when subjected to pulse width modulation control through the bridge circuit of the transistors Q1 to Q4.

As shown in FIG. 3A, the DC motor rotation information detecting device provides sections td in which impedance between the terminals of the motor M is increased, as detection regions of a surge component waveform superimposed on a voltage waveform between the terminals of the motor M. Specifically, for pulse width modulation control of the motor M, sections td (5 μs in this example) are provided in which impedance is cyclically increased by opening (disconnecting) the terminals of the motor M when the pulse width modulation signal (basic frequency 20 kHz) is switched between ON and OFF. By this construction, in the section td, impedance between the terminals of the motor M becomes higher than that when power voltage is applied between the terminals of the motor M, or when the terminals of the motor M is short-circuited. The section td is set as a sufficiently shorter period than a period during which surge occurs. That is, plural sections td are provided for one surge occurrence.

Figure 3B:
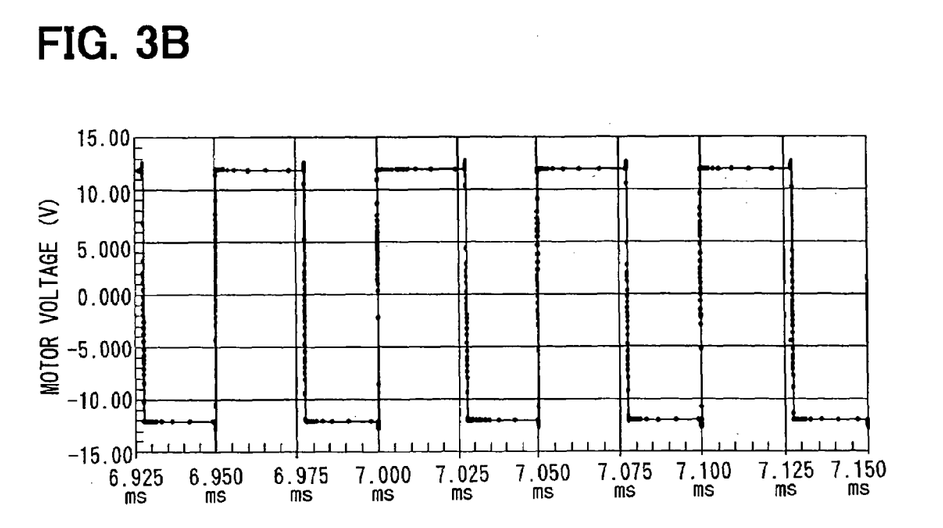

FIG. 3B is a timing chart showing an example of a voltage waveform between the terminals of the motor M when the sections td are not provided. However, exactly, also in this case, very short open periods (e.g., about 100 ns) are provided as dead time when the pulse width modulation signal is switched between ON and OFF, to prevent a through current from flowing through the transistors Q1 and Q4, and Q2 and Q3 (FIG. 1). As apparent from the comparison between the timing chart of FIG. 3A and the timing chart of FIG. 3B, the impedance between the terminals of the motor M is increased in the sections td. Thus increasing impedance between the terminals of the motor M increases signal strength for a surge component waveform superimposed on a voltage waveform between the terminals of the motor M, and reveals it. Therefore, by providing the sections td in which impedance between the terminals of the motor is increased, as a detection region of a surge component waveform, the surge detection errors (count errors) attributable to reduction in current values are suitably reduced.

In FIG. 1, the driving waveform detection circuit 2 basically includes an operational amplifier OP1, and low pass filters (first low pass filters) respectively comprising voltage dividing resistor R1 and R2, and R1' and R2', capacitors C1 and C1', and resistors R3 and R3'.

The DC motor rotation information detecting device adopts the power supply PS1 of power voltage 12V, wherein the motor M is applied with a voltage of 24V as Vpp (a voltage value from plus peak to minus peak of waveform) (FIG. 3A). By this construction, to adjust the voltage applied to the motor M according to an input voltage level of the operational amplifier OP1, the driving waveform detection circuit 2 adjusts voltage signals f1 and f2 taken out of the terminals of the motor M by the voltage dividing resistors R1 and R2, and the voltage dividing resistors R1' and R2', respectively. The adjusted voltage signals are purged of a carrier frequency component, that is, a driving signal component for the transistors Q1 to Q4 through the first low pass filters, respectively, and subjected to differential amplification through the operational amplifier OP1. The operational amplifier OP1 is connected with the resistors R4 and R5, and the resistors R4' and R5', and its amplification factor is decided by ratios between the resistors. A circuit provided in a lower portion of FIG. 1 is a circuit for producing a reference potential, which basically comprises a power supply PS2, voltage dividing resistors R13 and R14, and an operational amplifier OP4 as a buffer.

A differential amplification signal f3 subjected to differential amplification through the operational amplifier OP1 is applied the rotation signal extraction circuit 3. The rotation signal extraction circuit 3 basically comprises an operational amplifier OP2, capacitors C2 to C4 and resistors R6 to R8. A positive feedback secondary low pass filter (second low pass filter) is formed around the operational amplifier OP2. Like the first low pass filters provided in the input stage of the driving waveform detection circuit 2, the second low pass filter purges a carrier frequency component contained in the differential amplification signal f3. A surge component waveform f4 is extracted from a voltage waveform between the terminals of the motor M through the rotation signal extraction circuit 3.

The rotation pulse generation circuit 4 primarily comprises an operational amplifier OP3, a comparator COM1, a one-shot circuit ST, and a multiplexer MPX. A surge component waveform f4 extracted through the rotation signal extraction circuit 3 is amplified with an amplification factor of about (R9+R10)/R9 by an amplifier with negative feedback applied to the operational amplifier OP3. R9 is a resistance value of the resistor R9, and R10 is a resistance value of the resistor R10. In this embodiment, to allow for noises of low frequency regions generated due to changes in the speed of the motor M and the like, the amplifier is provided with low cut characteristic by interposing a capacitor C5 in the inversion input terminal of the operational amplifier OP3.

An amplification signal f5 amplified through the amplifier is applied to the inversion input terminal of the comparator COM1 to which negative feedback is applied. The amplification signal f5 is reversely amplified with an amplification factor −R12/R11 determined by a resistance ratio of an input resistor R11 and a feedback resistor R12, and is binarized based on a threshold value given to the non-inversion input terminal of the comparator COM1 through the multiplexer MPX. The multiplexer MPX selects an optimum value as the binarized threshold value from plural threshold voltages $V_{refl}$ to $V_{refn}$ based on information given from the control circuit 5. That is, the binarized threshold value is changeably set according to the operation conditions of the motor M such as rotation direction, rotation speed, and operation mode (e.g., one of start operation, braking operation, and steady operation).

A pulse signal binarized by the comparator COM1 is applied to the one-shot circuit ST. This one-shot circuit ST is constructed as shown in FIG. 4, and operates according to a truth table shown in FIG. 5.

Figure 4:
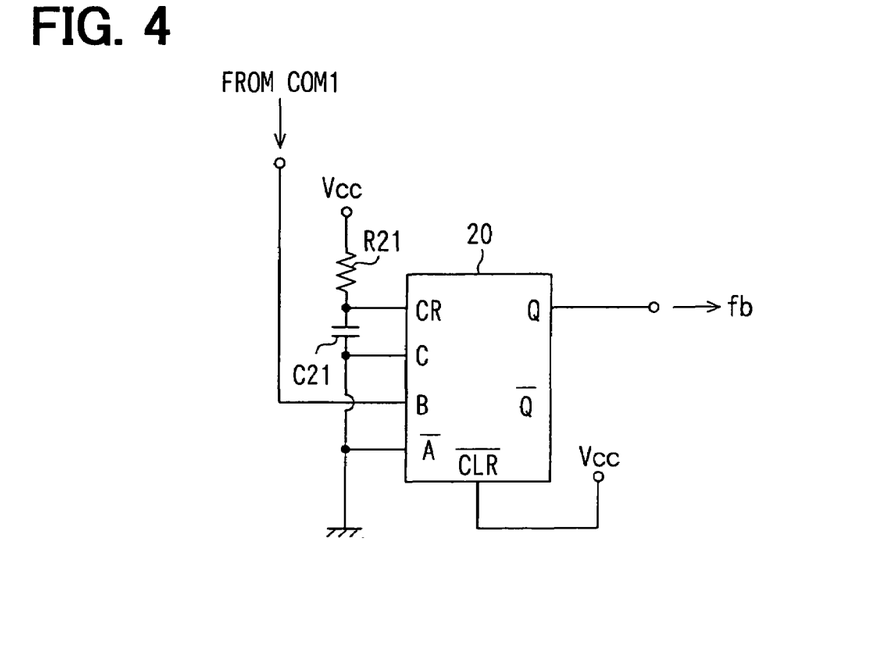
FIG. 4 is a circuit diagram showing an example of a one-shot circuit included in the DC motor rotation information detecting device according to the embodiment.
Figure 5:
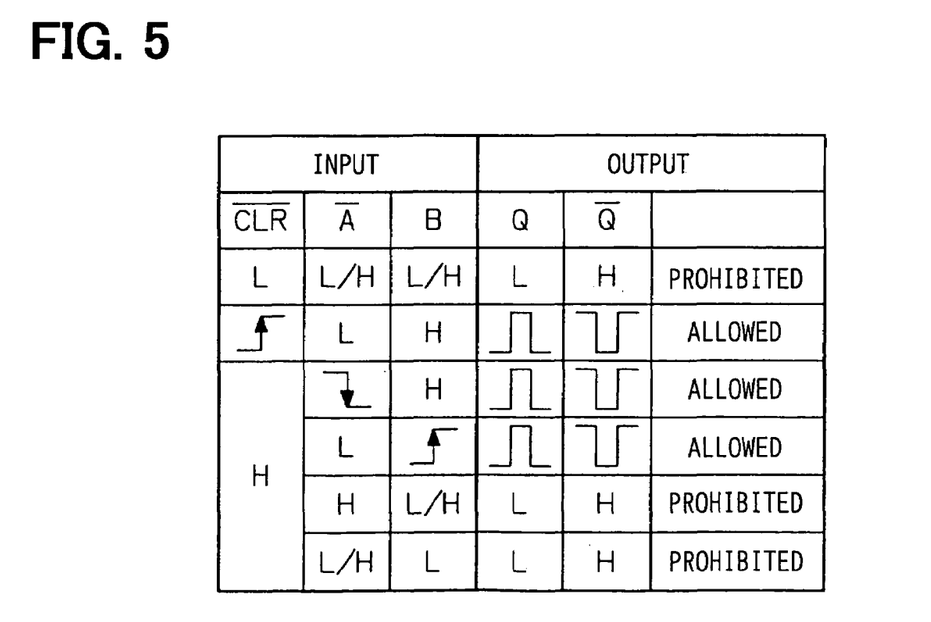
FIG. 5 is a truth table showing operation conditions of an IC constituting a circuit of the one-shot circuit.

As shown in FIG. 4, the one-shot circuit ST can be formed by connecting an external resistor R21 and an external capacitor C21 to a commercially available CMOS logic IC (multivibrator) 20. The IC 20 is a re-triggerable one-shot IC that forms a pulse signal corresponding to a pulse width set re-triggerable in advance, wherein the pulse signal binarized by the comparator COM1 is used as a trigger. The IC 20 operates according to the truth table of FIG. 5. Specifically, as shown in FIG. 4, when a potential (ground potential) of Low level is given to a terminal /A, and a potential (Vcc) of High level is given to a terminal /CLR, the IC 20 generates a pulse of a predetermined preset width on the rising edge of a pulse signal inputted to a terminal B as a trigger, and outputs the pulse from a terminal Q. The width of the generated pulse is determined by the resistance value and capacitance value (time constant) of the resistor R21 and the capacitor C21 that are connected to the terminal CR of the IC 20. The pulse width is set to about half of the surge cycle of a surge component waveform during the rotation of the motor M at the highest speed. As is well known, a re-triggerable one-shot circuit outputs (forms) a pulse of a predetermined preset width each time a trigger is inputted. When a new trigger is inputted when the pulse is being outputted, it outputs a pulse with the trigger as a base point. In this case, a pulse width is wider than normal pulse widths.

An output signal f6 of the one-shot circuit ST is applied to the control circuit 5 (FIG. 1). The control circuit 5 includes: an up/down counter 5a; a speed detection circuit 5b; a comparison circuit 5c; a target count command circuit 5d; an operation mode setting circuit 5e; a duty setting circuit 5f; and a driving timing generation circuit 5g. The output signal f6 (pulse signal) is applied to the up/down counter 5a and the speed detection circuit 5b. The up/down counter 5a counts up or counts down the number of pulses of the applied pulse signal. During the forward rotation of the motor M, the up/down counter 5a is brought into count-up operation. During the reverse rotation of the motor M, it is brought into count-down operation. The speed detection circuit 5b calculates the number of rotations (rotation speed) of the motor M from the pulse cycle of the applied pulse signal.

The target count command circuit 5d includes a register (not shown in the figure) in which, for example, plural rotation pulse converted values indicating plural rotation positions of the motor M are written in advance as target count values. In the case of a DC motor for moving a door for changing the outlet and an air mix amount of an air conditioner, a motor rotation position for turning the door upward and a motor rotation position for turning the door downward are written in advance to the register. Upon receiving a command to turn upward the door facing downward according to a driver's operation, the target count command circuit 5d receives a target count value indicating a motor rotation position for turning the door upward from the register and sends it to the comparison circuit 5c.

The comparison circuit 5c compares a count value sent from the up/down counter 5a, that is, a rotation pulse converted value indicating a current motor rotation position, and the target count value sent from the target count command circuit 5d. The operation mode setting circuit 5e receives the result of comparing the two values by the comparison circuit 5c, and to bring the two values into agreement based on the comparison result, determines a rotation direction (forward or reverse rotation), an operation mode (e.g., one of start operation, braking operation, and steady operation), and the like of the motor M.

The duty setting circuit 5f sets values (ratio) corresponding to the rotation direction and operation mode of the motor M by the operation mode setting circuit 53, as the duty ratio of a driving signal (pulse width modulation signal) for the transistors Q1 to Q4. For example, the duty ratio 45% and 55% as current values that enable the development of the surge component waveform are set in advance in the duty setting circuit 5f. The duty ratio 45% when the motor M is brought into the braking operation when being rotating forward, and the duty ratio 55% when the motor M is brought into the braking operation when being rotating in reverse are set as duty ratios of the driving signal for the transistors Q1 to Q4. The driving timing generation circuit 5g generates a driving signal (pulse width modulation signal) for the transistors Q1 to Q4 based on a duty ratio by the duty setting circuit 5f. At timing based on the driving signal (pulse width modulation signal) generated here, the transistors Q1 to Q4 are driven through the gate driving circuit 1a.

Figure 6:
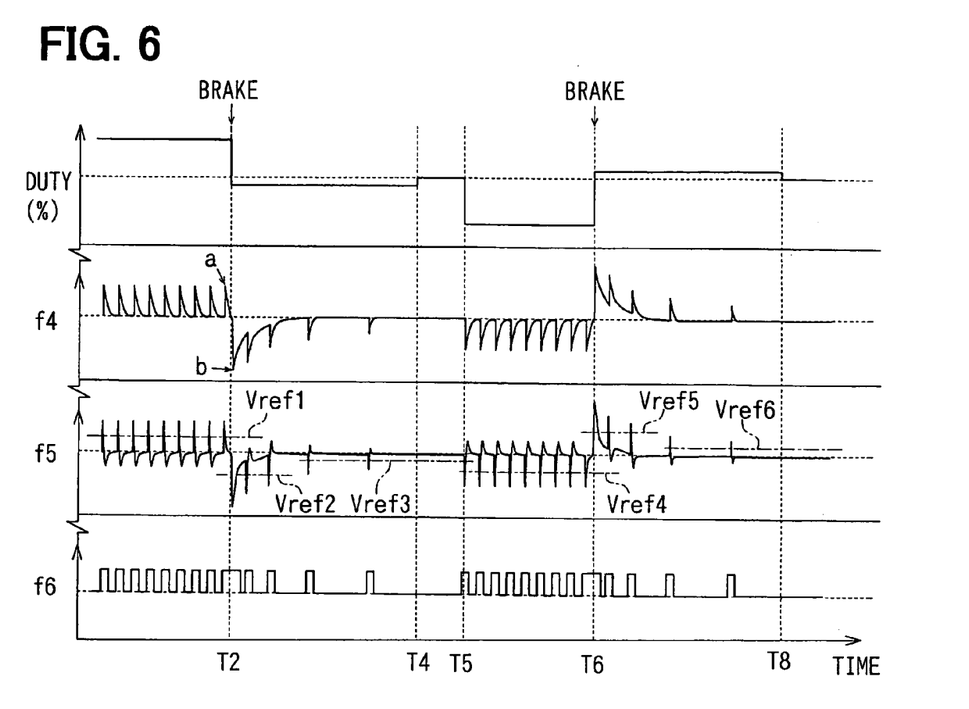
FIG. 6 is a timing chart showing examples of rotation information detection conditions of the DC motor rotation information detecting device according to this embodiment.

FIG. 6 is a timing chart showing examples of rotation information detection conditions in this embodiment. FIG. 6 shows, from the top to the bottom, the transition of duty ratios of a driving signal for the transistors Q1 to Q4, a surge component waveform f4 extracted through the rotation signal detection circuit 3, a waveform of the amplification signal f5 by an amplifier comprising the operational amplifier OP3 and the like, and a waveform of the output signal f6 of the one-shot circuit ST.

The multiplexer MPX (FIG. 1) selects an optimum voltage from plural threshold voltages $V_{ref1}$ to $V_{refn}$ based on information (operation conditions of the motor M) given from the control circuit 5 (speed detection circuit 5b, target count command circuit 5d, and operation mode setting circuit 5e). Specifically, as shown in FIG. 6, the multiplexer MPX responds flexibly to possible changes in the signal strength and polarity of surge due to changes in the operation conditions of the motor M and selects an optimum threshold voltage $V_{ref1}$ to $V_{ref6}$ for the operation conditions at a given moment. By this construction, a pulse signal synchronized with the rotation is generated in response to changes in the operation conditions of the motor M, with the result that rotation information can be detected with higher accuracy.

Immediately after the start of braking operation, an extra surge "b" due to a rush current component or the like may occur for a surge component waveform f4 extracted through the rotation signal extraction circuit 3. Therefore, when such a motor is a detection target, the pulses may be counted extra for the number of the extra surges in addition to the normal surges "a". On the other hand, according to the construction having the re-triggerable one-shot circuit ST, since an appropriate pulse width is set in the one-shot circuit ST, as shown by signal f6, the extra pulse is applied in a pulse due to the immediately preceding surge "a" of signal f4, and one wide pulse corresponding two pulses "a" and "b" is formed. By this construction, the extra pulses are no longer counted, so that extra counting of pulses will be prevented.

The above embodiment provides the following advantages.

(1) As a rotation information detection device that detects rotation information of the DC motor M based on the surge component waveform superimposed on the voltage waveform between the terminals of the DC motor M, a unit is provided which supplies a current of a current value $I_{pwm}$ 45% (during forward rotation) or $I_{pwm}$ 55% (during reverse rotation) to the motor M over the period from when the motor M starts braking operation to when it stops. Therefore, signal strength corresponding to the current value $I_{pwm}$ 45% or $I_{pwm}$ 55% is surely obtained for a surge component waveform superimposed on the current waveform of the motor M, so that the surge detection errors (count errors) attributable to reduction in current values are suitably prevented. As a result, the rotation information of the motor M can be accurately detected even in applications in which start and stop of the motor M are frequently repeated.

(2) Since the current control is achieved with simpler control, the construction of a portion controlling the current can be simplified.

(3) Duty ratios 45% and 55% as current values that enable the development of the surge component waveform superimposed on the voltage waveform between the terminals of the motor M are set in advance in the duty setting circuit 5f. Therefore, the current is easily controlled.

(4) The current values $I_{pwm}$ 45% and $I_{pwm}$ 55% are set so that torque added to the motor M by currents of these current values is smaller than loss torque obtained by adding internal loss torque of the motor M and external loss torque by external load applied to the shaft of the motor M. Therefore, when the current flowing through the motor M stays in the current values $I_{pwm}$ 45% and $I_{pwm}$ 55%, the motor M is no longer rotated by the current. Thus, motor's failure to stop completely and unintentional reverse rotation of the motor after it stops will not occur.

(5) Over the period from when the motor M starts the braking operation to when it stops, the direction of the current supplied to the motor M is set the same as that of the induction current by power generation operation flowing through the motor M. Thus, the supplied current and the induction current due to the power generation operation will not cancel out each other, and a certain current flows through the motor M. Furthermore, regardless of the magnitude of the induction current, at least the current of the current value $I_{pwm}$ 45% or $I_{pwm}$ 55% flows through the motor M without fail.

(6) Since the current supplied to the motor M is made to add torque in the direction opposite to the direction of rotation due to inertia during braking operation to the motor M, the braking time of the motor M can be expected to be reduced.

(7) The current flowing through the motor M is controlled by the pulse width modulation system. The current control can be achieved that is higher in terms of power use efficiency than power control by an analog system, so that the motor M can be driven with saved power.

(8) Voltage from the power supply PS1 applied to the bridge circuit is regulated to a constant voltage through the voltage regulator 6. In any of the case where an unstable power supply such as an on-vehicle battery is used as the power supply PS1 or the case where power voltage of the power supply PS1 fluctuates due to load fluctuation, the current supplied to the motor M corresponds well to the driving signal fed to the bridge circuit, so that more accurate motor control is performed.

(9) A unit is provided that provides the sections td (FIG. 3A) in which the impedance between the terminals of the motor is increased, as detection regions of the surge component waveform superimposed on the voltage waveform between the terminals of the motor M. The surge detection errors (count errors) attributable to reduction in current values are suitably reduced, so that rotation information of the motor can be accurately detected even in applications in which start and stop of the motor are frequently repeated.

(10) The sections td are cyclically provided through control of the current flowing through the motor M by the pulse width modulation system. Thus, the sections can be provided easily and more efficiently.

(11) The rotation signal extraction circuit 3 is provided that extracts the surge component waveform from the voltage waveform between the terminals of the motor M. The rotation information can be detected with higher accuracy by extracting the surge component waveform from the voltage waveform between the terminals of the motor M.

(12) The rotation pulse generation circuit 4 is provided that generates the pulse signal by binarizing the surge component waveform extracted by the rotation signal extraction circuit 3 based on the predetermined threshold value. Thus, the signals can be processed by a digital system, so that complicated operations can be performed with higher accuracy than with an analog system. By using the microcomputer and the like, the detection device can respond flexibly to the transient response property, trackability, and load fluctuation of the motor through software changes and additions as well as hardware changes and additions.

(13) The binarized threshold value is changeably set according to the operation conditions of the motor M such as rotation direction, rotation speed, and operation mode (e.g., one of start operation, braking operation, and steady operation). The pulse signal synchronized with the rotation is generated in response to changes in the operation conditions of the motor M, with the result that rotation information can be detected with higher accuracy.

(14) The re-triggerable one-shot circuit ST is provided that forms the pulse signal corresponding to the pulse width set re-triggerable in advance, wherein the pulse signal binarized by the comparator COM1 is used as a trigger. Thus, the extra counting of pulses is suitably curbed or prevented.

The above embodiment can be modified in various other ways. Some modifications are as follows.

Figure 7:
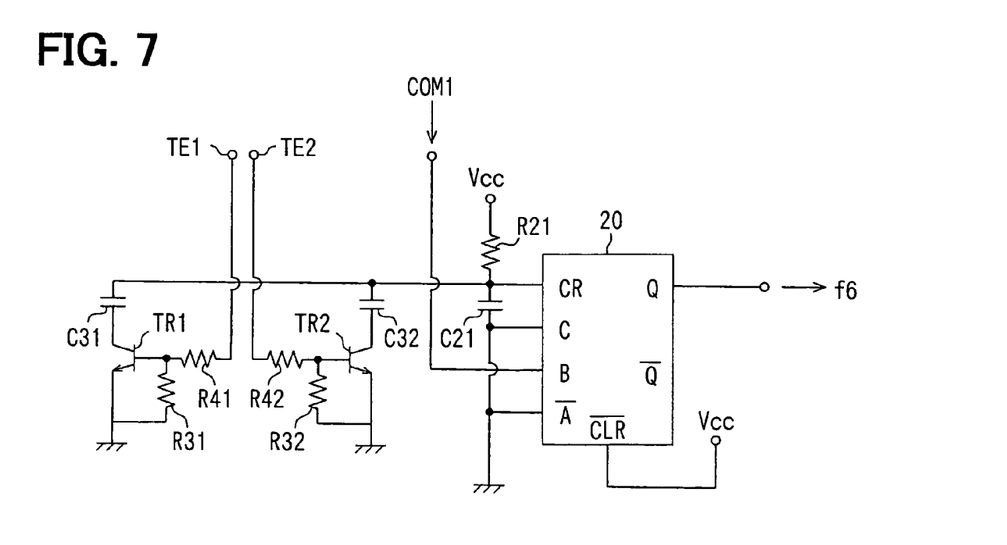
FIG. 7 is a circuit diagram showing an example of a one-shot circuit included in a variation of the DC motor rotation information detecting device according to the embodiment.

(A) In the embodiment, in place of the re-triggerable one-shot circuit shown in FIG. 4, a one-shot circuit shown in FIG. 7 may be adopted. In FIG. 7, elements shown in FIG. 4 that are identical to elements shown in FIG. 7 are identified by the same reference numerals, and duplicate descriptions of the elements will be omitted.

To make a capacitance value (time constant) given to the terminal CR of the IC 20 variable, transistors TR1 and TR2, resistors R31, R32, R41, and R42, and capacitors C31 and C32 are newly provided to the one-shot circuit shown in FIG. 4. Specifically, by giving appropriate signals from the terminals TE1 and TE2 to the transistors TR1 and TR2, a capacitance value (time constant) given to the terminal CR, that is, the width of a pulse generated and outputted in the circuit, can be adjusted according to the rotation speed of the motor M. For example, the terminals TE1 and TE2 are set at the potential of a logical low level during high-speed rotation of the motor M, the terminal TE1 is set at the potential of a logical high level and the terminal TE2 is set at the potential of a logical low level during medium-speed rotation, and both the terminals TE1 and TE2 are set at the level of a logical high level during low-speed rotation. As a result, a pulse width corresponding to a rotation speed of the motor can be set. In this way, the pulse width set in the one-shot circuit is set variable according to rotation speeds of the motor M. Thus, the detection device can respond flexibly to even changes in a surge component waveform due to changes in rotation speeds of the motor M.

For example, when the motor M is rotating at an extremely low speed, according to contact states of a sliding circuit comprising brushes and commutators of the motor, plural surges may occur by one switching between the brushes and the commutators. In this case, a difference (extra counting) occurs between the number of surges of a surge component waveform contained in a motor current waveform and a voltage waveform between the terminals of the motor, and the number of switchings between the brushes and commutators, that is, motor rotation state (rotation position). In this point, the detection device can respond flexibly to such a case. Specifically, when the motor is rotating at an extremely low speed, by setting the pulse width to a relatively long width, extra pulses that could cause extra counting are applied in the immediately preceding pulse and not counted, so that erroneous detection of motor rotation information is prevented.

(B) The one-shot circuit is not necessarily required and may be eliminated depending on, e.g., the characteristics and the uses of the motor.

(C) The binarized threshold value may be set variably according to operation conditions of the motor M, e.g., rotation accelerations of the motor M.

(D) In place of providing the sections td by opening the terminals of the motor M, the sections td may be provided as required by cyclically connecting a load between the terminals of the motor M. In short, impedance between the terminals of the motor M has only to be increased in the sections td. In this case, it is useful to change a cycle in which the increased sections td between the terminals of the motor M are provided, according to operation conditions of the motor M. However, it is not mandatory to cyclically provide the increased sections td between the terminals of the motor M; the sections td have only to be provided at least in a surge detection region.

(E) The voltage regulator 6 may be omitted in the case where a stabilized power supply is used as the power supply PS1, and the case where fluctuations in power voltages attributable to load fluctuations or the like are negligible.

(F) In place of controlling currents flowing through the motor M by the pulse modulation system (second system), the currents may be controlled by the first system of pulse width modulation control described in the embodiment, or by an analog system different from it.

(G) In the embodiment, the addition of the current supplied over the period from when the motor M starts braking operation to when it stops may be eliminated. Even so, the above advantages other than (6) can be provided.

(H) In the embodiment, setting the direction of the current to the motor M to be the same as that of the induction current may be changed. Even so, the above advantages other than (5) can be provided.

(I) In the embodiment, setting the motor current so that the torque added to the motor M by the current becomes smaller than the loss torque and the external loss torque may be changed. Depending on the characteristics and uses of the motor M, necessary rotation information of the motor can also be obtained by other than current values in such a range.

(J) The rotation pulse generation circuit 4 may be eliminated, when an analog circuit or the like can keep track of the motor rotation based on the surge component waveform extracted by the rotation signal extraction circuit 3. However, when such rotation information is subjected to computer processing or digital processing, it is preferred to attain the binarization.

(K) In place of extracting a surge component waveform from a voltage waveform between the terminals of the motor M, the motor rotation information may be detected based on other surge component waveform without using the surge extraction circuit 3.

(L) In place of setting the duty ratios to 45% and 55% by the duty setting circuit 5f, the current values may be made variable according to operation conditions of the motor M.

(M) In place of detecting the rotation information of the motor M based on the surge component waveform superimposed on the motor voltage waveform, the rotation information may be detected from a current waveform flowing through the motor. Furthermore, rotation information may be detected based on both waveforms of the motor voltage and the motor current.

(N) In place of using the current value $I_{pwm}$ 45% (during forward rotation) or $I_{pwm}$ 55% (during reverse rotation) to the motor M over the period from when the motor M starts braking operation to when it stops, other methods may be used. For example, for a predetermined period after the braking operation is started, when it is confirmed in advance that the induction current that enables the development of the surge component waveform is sufficiently secured, the current may be supplied to the motor M after the predetermined period elapses after the braking operation is started. In this modification, the above advantages (1) and (2) can be provided.

A reference current value set as a lower limit of a current flowing through the motor M is arbitrary without being limited to $I_{pwm}$ 45% and $I_{pwm}$ 55%. Furthermore, in the period from when the motor M starts braking operation to when it stops, the current value of the current flowing through the motor M is detected, and only when the current value falls below the reference current value, the current may be supplied to the motor M to compensate for the difference. That is, it will suffice that the current flowing through the motor M is controlled so that the current flowing through the motor M is equal to or greater than the reference current value set as its lower limit in the period from when the motor starts braking operation to when it stops.

(O) In place of detecting the rotation information for both forward rotation time and reverse rotation time, it may be detected for only one of the forward rotation time and the reverse rotation time.

What is claimed is:

1. A DC motor rotation information detecting device for detecting rotation information, comprising:
   a detection circuit that detects a surge component waveform superimposed on a signal waveform of at least one of a current flowing through a DC brush motor and a voltage between the terminals of the motor; and
   a control circuit that controls the current flowing through the motor in a period from when the motor starts braking operation to when the motor stops to be equal to or greater than a reference current value set as a lower limit,
   wherein the control circuit controls the current by pulse width modulation.

2. The DC motor rotation information detecting device according to claim 1, wherein the reference current value is set in advance as a current value that enables appearance of the surge component waveform superimposed on the signal waveform.

3. The DC motor rotation information detecting device according to claim 1, wherein the reference current value is set so that torque added to the motor through the current is smaller than loss torque obtained by adding internal loss torque of the motor and external loss torque by an external load applied to the motor.

4. The DC motor rotation information detecting device according to claim 1, wherein the circuit supplies the current of the reference current value to the motor over the period from when the motor starts the braking operation to when the motor stops.

5. The DC motor rotation information detecting device according to claim 4, wherein a direction of the current is the same as that of an induction current fed by counter-electromotive force due to power generation operation during the braking operation of the motor.

6. The DC motor rotation information detecting device according to claim 4, wherein the current adds torque to the motor in a direction opposite to a direction of rotation due to inertia during the braking operation.

7. The DC motor rotation information detecting device according to claim 1, wherein the circuit for controlling the current includes a bridge circuit driven to perform current control by the pulse width modulation, and a voltage regulator that regulates a voltage applied to the bridge circuit to a constant voltage.

8. A DC motor rotation information detecting device for detecting rotation information, comprising:
- a detection circuit that detects a surge component waveform superimposed on a signal waveform of a voltage between the terminals of a DC brush motor; and
- a control circuit that provides a section in which an impedance between the terminals of the motor is increased, as a detection region of the surge component waveform is superimposed on the signal waveform,
- wherein the control circuit provides the section cyclically through control of a current flowing through the motor by pulse width modulation.

9. The DC motor rotation information detecting device according to claim 8, further comprising:
- a rotation signal extraction circuit that extracts the surge component waveform from the signal waveform.

10. The DC motor rotation information detecting device according to claim 9, further comprising:
- a rotation pulse generation circuit that generates a pulse signal by binarizing the surge component waveform extracted by the rotation signal extraction circuit based on a predetermined threshold value.

11. The DC motor rotation information detecting device according to claim 10, further comprising:
- a re-trigerrable one-shot circuit that forms a pulse signal corresponding to a pulse width set re-triggerable in advance,
- wherein the pulse signal generated by the rotation pulse generation circuit is used as a trigger.

12. A DC motor rotation information detecting device for detecting rotation information, comprising:
- a detection circuit that detects a surge component waveform superimposed on a signal waveform of at least one of a current flowing through a DC brush motor and a voltage between the terminals of the motor; and
- a control circuit that provides a section in which impedance between the terminals of the motor is increased as a detection region of the surge component waveform superimposed on the signal waveform;
- a rotation signal extraction circuit that extracts the surge component waveform from the signal waveform;
- a rotation pulse generation circuit that generates a pulse signal by binarizing the surge component waveform extracted by the rotation signal extraction circuit based on a predetermined threshold value: and
- a re-triggerable one-shot circuit that forms a pulse signal corresponding to a pulse width set re-triggerable in advance,
- wherein a pulse width set in the one-shot circuit is variable according to a rotation speed of the motor and
- wherein the pulse signal generated by the rotation pulse generation circuit is used as a trigger.

13. The DC motor rotation information detecting device according to claim 12, wherein the threshold value is variable according to operation conditions of the motor.

14. The DC motor rotation information detecting device according to claim 13, wherein the operation conditions of the motor include at least one of an operation mode, a rotation direction and a rotation speed of the motor.

* * * * *